(12) United States Patent
Jundt et al.

(10) Patent No.: US 12,509,036 B2
(45) Date of Patent: Dec. 30, 2025

(54) ELECTROPNEUMATIC EQUIPMENT FOR A VEHICLE WITH AN AUTONOMOUS BRAKE CIRCUIT SUPPLIED WITH BACKUP PRESSURE AS A PRECAUTION

(71) Applicant: Knorr-Bremse Systeme Fuer Nutzfahrzeuge GmbH, Munich (DE)

(72) Inventors: Oliver Jundt, Hessigheim (DE); Falk Hecker, Markgroeningen (DE); Jonas Leibbrand, Eberdingen (DE); Stefan Hummel, Stuttgart (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 71 days.

(21) Appl. No.: 18/559,603

(22) PCT Filed: May 20, 2022

(86) PCT No.: PCT/EP2022/063727
§ 371 (c)(1),
(2) Date: Nov. 8, 2023

(87) PCT Pub. No.: WO2022/253594
PCT Pub. Date: Dec. 8, 2022

(65) Prior Publication Data
US 2024/0425022 A1    Dec. 26, 2024

(30) Foreign Application Priority Data
May 31, 2021    (DE) ..................... 10 2021 114 055.2

(51) Int. Cl.
*B60T 8/172*    (2006.01)
*B60T 7/12*    (2006.01)
(Continued)

(52) U.S. Cl.
CPC ................ *B60T 8/172* (2013.01); *B60T 7/12* (2013.01); *B60T 13/36* (2013.01); *B60T 13/581* (2013.01);
(Continued)

(58) Field of Classification Search
CPC . B60T 8/172; B60T 7/12; B60T 13/36; B60T 13/581; B60T 13/662;
(Continued)

(56) References Cited

FOREIGN PATENT DOCUMENTS

DE    102014112015 A1    2/2016
DE    102015016720 A1    6/2017
(Continued)

OTHER PUBLICATIONS

Machine Translation of WO 2019115683 A1 PDF File Name: "WO2019115683A1_Machine_Translation.pdf" (Year: 2019).*
(Continued)

*Primary Examiner* — Grant Moubry
*Assistant Examiner* — Ruben Picon-Feliciano
(74) *Attorney, Agent, or Firm* — NORTON ROSE FULBRIGHT US LLP

(57) ABSTRACT

Electric equipment for a vehicle with an electropneumatic service brake device, in which at least one pneumatic brake control pressure is immediately and directly controlled to the electromagnetic backup valve, which is still being closed by a current, of at least one pressure regulating module in response to an assistance brake request signal regardless of a defect of an electric service brake circuit. For a failure of the electric service brake circuit, the electromagnetic backup valve, which is then in the currentless state, of the at least one pressure regulating module is automatically opened, and the brake pressure is immediately formed in the pressure regulating module based on the at least one pneumatic brake control pressure already present in the pressure regulating (Continued)

module. Thus, the reaction time of a pneumatic redundancy of the electropneumatic service brake device in response to electric defects is reduced.

24 Claims, 3 Drawing Sheets

(51) Int. Cl.
*B60T 8/17* (2006.01)
*B60T 13/36* (2006.01)
*B60T 13/58* (2006.01)
*B60T 13/66* (2006.01)
*B60T 13/68* (2006.01)

(52) U.S. Cl.
CPC .......... *B60T 13/662* (2013.01); *B60T 13/683* (2013.01); *B60T 8/1701* (2013.01); *B60T 2201/03* (2013.01); *B60T 2220/04* (2013.01); *B60T 2250/02* (2013.01); *B60T 2270/402* (2013.01); *B60T 2270/413* (2013.01)

(58) Field of Classification Search
CPC .. B60T 13/683; B60T 8/1701; B60T 2201/03; B60T 2220/04; B60T 2250/02; B60T 2270/402; B60T 2270/413; B60T 15/043; B60T 15/18; B60T 17/221; B60T 2270/403
See application file for complete search history.

(56) References Cited

FOREIGN PATENT DOCUMENTS

| | | |
|---|---|---|
| DE | 102017002716 A1 | 9/2018 |
| DE | 102017002721 A1 | 9/2018 |
| DE | 102017113336 A1 | 12/2018 |
| DE | 102018219378 A1 | 5/2020 |
| DE | 102019106274 A1 | 9/2020 |
| DE | 102019106591 A1 | 9/2020 |
| DE | 102019131110 A1 | 5/2021 |
| DE | 102020130277 A1 | 5/2021 |
| EP | 2090481 B1 | 11/2013 |
| EP | 3421309 A1 | 1/2019 |
| WO | WO-2019115683 A1 * | 6/2019 ............ B60T 13/662 |

OTHER PUBLICATIONS

International Search Report for PCT/EP2022/063727, Issued Sep. 30, 2022.

* cited by examiner

ELECTROPNEUMATIC EQUIPMENT FOR A VEHICLE WITH AN AUTONOMOUS BRAKE CIRCUIT SUPPLIED WITH BACKUP PRESSURE AS A PRECAUTION

FIELD OF THE INVENTION

The present invention relates to electric equipment for a vehicle, in particular a vehicle configured as a towing vehicle-trailer combination, according to the preamble of claim 1, as well as to a vehicle comprising such electric equipment according to claim 23.

BACKGROUND INFORMATION

Vehicles with (partially) automated driving functions that relieve the driver of the driving task and responsibility, at least for a limited time, i.e., that can be operated autonomously, for example, must be able to continue driving the vehicle in the event of any fault until the driver takes over again.

The "fail-operational" system property derived from this requires that the basic functions of the vehicle continue to be guaranteed, particularly at the execution level, at least with functional restrictions. For brake control in autonomous driving operation, this means that it must still be possible to operate the electropneumatic service brake device under electronic control if any fault occurs, so that vehicle dynamics control functions such as ABS, TCS, ESP can also continue to be implemented, albeit possibly with restrictions.

Redundancy of all components of the electropneumatic service brake device in order to create complete redundancy is expedient in terms of maintaining functionality even in the event of a fault, but is not justifiable in terms of cost, installation space and weight, especially in series production.

A generic electric equipment is discussed in DE 10 2018 219 378 A1. There, in an electropneumatic service brake device, an electric service brake circuit is controlled by a primary control means. The primary control means receives an electric braking request signal from a foot brake module and, depending on this signal, electrically controls a pressure control module, which is acted upon in parallel by a first pneumatic brake control pressure at a pneumatic control input.

If the primary control means fails, which is determined by the occurrence of a switchover condition such as a detected fault in the primary control means and/or in their power supply, a redundancy control means controls a pneumatic service brake circuit by generating a pneumatic brake control pressure via a solenoid valve device, which pressure then flows through the now de-energized backup valve of the pressure control module and is used in the pressure control module as wheel brake pressure. The evaluation of the changeover condition and the flow of the brake control pressure to the pressure control module require a certain amount of time, however, wherein in the event of a defect, a quick response is required to generate the wheel brake pressure.

SUMMARY OF THE INVENTION

Therefore, it is an object of the present invention to develop an electric equipment in such a way that, in the event of a fault, compensation can take place very quickly. Likewise, a vehicle comprising such electric equipment is to be provided.

This object may be achieved with the features as described herein. Advantageous developments are the subject of the further descriptions herein.

The invention is based on electropneumatic equipment of a vehicle with a prime mover operable by an ignition or starting signal, comprising an electropneumatic service brake device, wherein the electropneumatic service brake device has at least:

a) pneumatic wheel brake actuators,
b) at least one electric service brake circuit,
c) at least one pneumatic service brake circuit,
d) an at least electric service brake input device (FIG. 2, 200), which generates an electric actuation signal (BS) within the at least one electric service brake circuit,
e) within the electric service brake circuit, a primary electronic brake control device which generates a first electric braking request signal (S1) representing a target brake pressure in dependence on the electric actuation signal (BS),
f) a secondary electronic brake control device which, in particular in dependence on an assistance braking request signal (AS), automatically generated by a driver assistance system and/or in particular in dependence on the electric actuation signal (BS), and/or in particular independently of the ignition or start signal, controls at least one electrically actuated actuator by means of a second electric braking request signal (S2), which actuator is configured to generate at least one pneumatic brake control pressure (p1, p2) on the basis of the second electric braking request signal (S2),
g) at least one electropneumatic pressure control module with an integrated electronic control unit as a component of the at least one electric service brake circuit, wherein the at least one electropneumatic pressure control module is configured
  g1) to receive the first electric braking request signal (S1) at an electric control input of the pressure control module and to generate an electronically controlled brake pressure for the wheel brake actuators within the at least one electric service brake circuit in dependence on the first electric braking request signal (S1), and
  g2) to receive the at least one pneumatic brake control pressure (p1, p2) at at least one pneumatic control input of the pressure control module and to generate a brake pressure for the wheel brake actuators depending on the at least one pneumatic brake control pressure (p1, p2) within the at least one pneumatic service brake circuit, and
  g3) to feed the brake pressure into the pneumatic wheel brake actuators, and
  g4) which comprises at least one electromagnetic backup valve which is connected to the pneumatic control input and which is configured and controlled such that it
    g4a) retains the at least one pneumatic brake control pressure (p1, p2) when the at least one electric service brake circuit is intact, but
    g4b) otherwise, if the at least one electric service brake circuit has a defect, allows the at least one pneumatic brake control pressure (p1, p2) to pass through so that the at least one pressure control module can generate the brake pressure in dependence on the at least one pneumatic brake control pressure (p1, p2).

}

The electropneumatic service brake device may be an electronic braking system (EBS) with brake pressure control. A driver assistance system is to be understood to be a system which is capable of automatically or autonomously generating the assistance braking request signal AS, in particular in dependence on operating or driving parameters of the vehicle (for example speed, rate of rotation, deceleration, acceleration, roll rate) or on a driving situation relative to other vehicles (for example distance, relative speed).

In particular, the electric service brake circuit comprises at least the at least one electric channel of the service brake input device (FIG. 2, 200) with the electric brake value transmitter, an electric primary supply source, the primary electronic control device and the integrated control unit of the at least one pressure control module.

The pneumatic service brake circuit comprises in particular at least one pneumatic channel of a service brake valve device as service brake input device (FIG. 2, 200) and the pneumatic part of the at least one pressure control module. The pneumatic service brake circuit is then controlled by the at least one brake control pressure p1, p2 when there is a braking request from the driver. When the assistance braking request signal AS of the driver assistance system is present, the pneumatic service brake circuit is controlled by the secondary electronic control device and the electrically actuated actuator by means of the at least one brake control pressure p1, p2. In addition, a braking request from the driver and an assistance braking request signal AS from the driver assistance system can also be present in parallel, wherein the pneumatic service brake circuit is likewise controlled by the at least one brake control pressure p1, p2.

The electric service brake circuit can therefore be subject to electric open-loop or closed-loop control in particular exclusively by the primary electronic control device and the pneumatic service brake circuit, in particular exclusively by the secondary electronic control device. Furthermore, the electropneumatic service brake device is in particular configured such that the secondary electronic brake control device does not or cannot provide electric open-loop or closed-loop control of the at least one pressure control module and/or open-loop or closed-loop control of the electric service brake circuit. Therefore, the secondary electronic brake control device is also not intended to form a component of the electric service brake circuit.

The at least one pneumatic brake control pressure p1, p2 is already present at the at least one electromagnetic backup valve in particular in response to any actuation of the service brake actuating member. Therefore, before the electric service brake circuit controlled by the primary electronic control device fails, the at least one pneumatic brake control pressure p1, p2 is already present at the electromagnetic backup valve (still) closed by energization by means of the primary electronic control device, so that, in the event of a failure of the electric service brake circuit controlled by the primary electronic control device, the electromagnetic backup valve which is then de-energized opens and allows the at least one pneumatic brake control pressure p1, p2 to pass through to a valve device integrated in the pressure control module and controls the latter pneumatically. In the at least one pressure control module, the wheel brake pressure or wheel brake pressures are then formed on the basis of or in dependence on the at least one pneumatic brake control pressure p1, p2. In the case of driver-only braking, therefore, the electric control of the electropneumatic service brake device within the electric service brake circuit can be taken over relatively quickly by the then all-pneumatic control by means of the at least one pneumatic brake control pressure p1, p2 within the at least one pneumatic service brake circuit.

Such a fast reaction of the at least one pneumatic service brake circuit controlled by the secondary electronic brake control device is not provided, however, if the open-loop/closed-loop control of the pneumatic service brake circuit is only taken over by the secondary electronic brake control device when a defect is detected, for example in the electric service brake circuit, and only then is the at least one pneumatic brake control pressure p1, p2 for the pneumatic control of the at least one pressure control module generated and directed to the at least one electromagnetic backup valve of the at least one pressure control module.

To solve this problem, according to a first aspect, the invention proposes that h) the at least one electrically actuated actuator is controlled by the secondary electronic brake control device in dependence on the assistance braking request signal (AS) and/or in dependence on the actuation signal (BS) in such a way that, irrespective of a defect in the electric service brake circuit, the at least one pneumatic brake control pressure p1, p2 is generated by the electrically actuated actuator in response to the assistance braking request signal (AS) and/or in response to the brake actuation signal (BS), and is fed into the at least one pneumatic control input of the at least one pressure control module.

Consequently, the at least one pneumatic brake control pressure p1, p2 is already present at the pneumatic control input or at the backup valve of the at least one pressure control module when a defect of the electric service brake circuit has not yet occurred. In the event of a failure or defect of the electric service brake circuit, the at least one electromagnetic backup valve, which is then de-energized, of the at least one pressure control module opens automatically and the brake pressure can be formed immediately in the pressure control module on the basis of or in dependence on the at least one pneumatic brake control pressure p1, p2.

In particular, the secondary electronic brake control device and the at least one actuator are configured in such a way that the at least one pneumatic brake control pressure p1, p2 is dependent on the autonomous or automatic braking request which the assistance braking request signal AS represents or embodies. It can be provided here that the greater the absolute value of the autonomous or automatic braking request, the greater the at least one pneumatic brake control pressure p1, p2, and that the smaller the absolute value of the autonomous or automatic braking request, the smaller the at least one pneumatic brake control pressure p1, p2.

Consequently, in an advantageous manner, fast redundancy for a failed electric service brake circuit is ensured by controlling the at least one pneumatic service brake circuit by means of the at least one pneumatic brake control pressure p1, p2 in the case when an assistance braking request signal AS is generated by the driver assistance system, regardless of whether or not the driver actuates the service brake actuating member.

Further, in accordance with a second aspect of the invention, it has been recognized that if, for example, both the electric service brake circuit and an electric starter of the prime mover of the vehicle are supplied with power from the same primary supply source when the ignition or start signal for the prime mover of the vehicle is generated, which causes the prime mover of the vehicle to be set in operation, the voltage in the electric service brake circuit may drop to such an extent that the latter is insufficiently energized and then fails to operate. The electric service brake circuit would then not be intact for the duration of the voltage drop.

But then, as described above, the timing problem of evaluating the switchover condition to switch to the pneumatic service brake circuit would again occur, wherein, in the event of a defect, a quick response is required to generate the wheel brake pressure.

However, it has been recognized that, in the event of a voltage dip caused by generation of the ignition or start signal, the electromagnetic backup valve of the at least one pressure control module is de-energized and opens so that a pneumatic brake control pressure p1, p2 generated by the at least one electrically actuated actuator can be passed through the opened backup valve to allow the at least one pressure control module to generate the brake pressure.

According to the second aspect of the invention, it is then provided that i) the at least one electrically actuated actuator is controlled by the secondary electronic brake control device, which is energized in particular by an electric secondary supply source, in such a way that the at least one pneumatic brake control pressure p1, p2 is generated by the at least one electrically actuated actuator independently of, and in particular already before, the generation of the ignition or start signal for the prime mover of the vehicle and is fed into the at least one pneumatic control input of the at least one pressure control module.

Consequently, the at least one pneumatic brake control pressure p1, p2 is already present at the pneumatic control input or at the backup valve of the at least one pressure control module when the ignition or start signal for the prime mover of the vehicle has not yet been generated. In the event of a voltage drop caused by the ignition or start signal and the resulting failure or defect of the electric service brake circuit, the at least one electromagnetic backup valve, which is then de-energized, of the at least one pressure control module opens automatically and the brake pressure can be formed immediately in the pressure control module on the basis of or in dependence on the at least one pneumatic brake control pressure p1, p2.

Further embodiments of the invention are described in the further descriptions herein.

Particularly, the secondary electronic brake control device and the at least one electric actuator may be configured or the at least one actuator is controlled by the secondary electronic brake control device in such a way that the at least one pneumatic brake control pressure p1, p2 is generated and fed into the at least one pneumatic control input of the pressure control module in response to any assistance braking request signal (AS) and/or in response to any brake actuation signal BS which represents, in particular, an autonomous or automatic braking request of which the absolute value is greater than the absolute value of a limit braking request $a_{grenz}$.

As a result, the at least one pneumatic brake control pressure p1, p2 is immediately and directly applied to the at least one electromagnetic backup valve, (still) closed as a result of being energized, of the at least one pressure control module in response to any (generated) assistance braking request signal AS and/or in response to any brake actuation signal (BS) representing a braking request of which the absolute value is greater than the absolute value of the limit braking request $a_{grenz}$.

In particular, the limit braking request $a_{grenz}$ may be zero or may represent a non-zero deceleration. In particular, if the limit braking request $a_{grenz}$ represents a non-zero deceleration, then the pneumatic control pressure $p_{St}$ and consequently the at least one brake control pressure p1, p2, for example, are generated and used to control the pneumatic service brake circuit only after the vehicle reaches a limit deceleration. This has the advantage that the wear of the actuator is then reduced and the acoustic behavior is improved because the at least one brake control pressure p1, p2 is then not generated for every braking request, however small.

In particular, a data link can also be provided between the primary electronic brake control device and the secondary electronic brake control device, in particular for data and signal exchange and/or for the purpose of mutual monitoring.

The service brake input device (FIG. 2, 200) can in particular be an all-electric service brake input device, which only generates the electric actuation signal (BS) but no pneumatic brake control pressure, or an electropneumatic service brake valve device, which in addition to the electric channel generates the at least one pneumatic brake control pressure p1, p2 in at least one pneumatic channel. The service brake input device (FIG. 2, 200) can have a service brake actuating member and, within the at least one electric service brake circuit, at least one electric channel with at least one electric brake value transmitter which is actuatable by the service brake actuating member and generates the electric actuation signal BS in dependence on an actuation of the service brake actuating member.

Alternatively, the service brake input device (FIG. 2, 200) can also be formed by any electronic control unit, in particular also an electronic control unit of an autopilot system, which provides open-loop or closed-loop control of the vehicle automatically or autonomously.

Also, the electropneumatic service brake valve device may be configured such that, by an actuation of the service brake actuating member due to a driver braking request, at least one control piston of the service brake valve device is loaded with a first actuation force F1 and the control piston directly or indirectly controls at least one double-seat valve of the service brake valve device including an inlet seat and an outlet seat in order to generate the at least one pneumatic brake control pressure p1, p2.

In a particular manner, the at least one electrically actuated actuator can comprise the service brake valve device as well as means for generating a second actuating force $F_2$, which acts in parallel with respect to the first actuating force $F_1$ and in the same or opposite direction on the at least one control piston of the service brake valve device.

In particular, the means for generating the second actuating force may include an electrically controlled, in particular electric, electrohydraulic, or electropneumatic force generator.

According to a development, the electropneumatic force generator can comprise a solenoid valve device fed from a compressed air supply with supply compressed air under supply pressure, which generates a pneumatic control pressure $p_{St}$ on the basis of the supply compressed air at the control piston of the service brake valve device, on which the second actuating force $F_2$ is based.

The solenoid valve device may, for example, comprise an inlet/outlet solenoid valve combination of one or more 2/2-way solenoid valves, or of a 3/2-way solenoid valve and a 2/2-way solenoid valve, or a proportional solenoid valve or a plurality of proportional solenoid valves and optionally additionally at least one relay valve.

It may also be provided that the primary electronic brake control device, the integrated control unit of the at least one pressure control module and the brake value transmitter of the service brake valve device are connected to a primary control connection SV1.

The primary control connection SV1 may be separate and independent from a secondary control connection SV2, to which the secondary electronic brake control device and at least part of the force generator are connected. This ensures independence of the power, data and signal flows, which has a positive effect on the availability of the electropneumatic service brake device.

The driver assistance system can comprise, for example, an autopilot device for at least semi-autonomous driving or for autonomous driving, a vehicle dynamics control system (ESP) or an emergency brake assistant.

In particular, the driver assistance system can generate the assistance braking request signal AS automatically and independently of a driver braking request or of the electric actuation signal BS.

A control logic of the driver assistance system or the driver assistance system can in particular also be implemented in the primary electronic brake control device and/or in the secondary electronic brake control device.

Also, the primary electronic brake control device may be supplied with electric power from a primary supply source that is independent of a secondary supply source that supplies electric power to the secondary electronic brake control device.

The secondary electronic brake control device and the at least one actuator can be configured such that the at least one pneumatic brake control pressure p2 is generated and fed into the at least one pneumatic control input of the pressure control module in dependence on at least the following variables:

a) a mass ratio between a towing vehicle and a trailer,
 b) the axle loads of at least two axles of the vehicle,
 c) a number of pneumatic channels of the service brake valve device.

According to a development, the primary electronic brake control device can generate the first electric braking request signal S1 depending on the electric actuation signal BS and/or depending on the assistance braking request signal AS.

Pressure control valves which can be electrically controlled by the primary electronic brake control device and/or by the secondary electronic brake control device can also be provided and can be used to individually control the brake pressure in a pneumatic wheel brake actuator. These pressure control valves are configured in particular as ABS pressure control valves and are connected, for example, between the at least one pressure control module and the pneumatic wheel brake actuator(s) in order to maintain, reduce or increase the brake pressure in dependence on brake slip.

The electropneumatic service brake device may comprise at least one first brake circuit and one second brake circuit, wherein the brake pressure is generated individually for each brake circuit.

The electropneumatic service brake valve device can also be configured to generate a first pneumatic brake control pressure p1 for a first pneumatic service brake circuit and a second pneumatic brake control pressure p2 for a second pneumatic service brake circuit, with the circuits being kept separate.

Furthermore, the electropneumatic service brake device may comprise at least one first brake circuit for a first axle (VA) of the vehicle and at least one second brake circuit for a second axle (HA) of the vehicle and may be configured to individually generate a first brake pressure $p_{Va}$ for the first brake circuit and a second brake pressure $p_{HA}$ for the second brake circuit, wherein the pressure control module is configured as a 2-channel pressure control module and generates the first brake pressure $p_{Va}$ on the basis of the first pneumatic brake control pressure p1 and the second brake pressure PHA on the basis of the second pneumatic brake control pressure (p2).

Also, the electropneumatic service brake device can comprise a trailer control module, which is configured as a pressure control module and which is electrically controlled at its electric control input by the first electric braking request signal S1, and which is pneumatically controlled at its pneumatic control input by the first brake pressure $p_{Va}$ or the second brake pressure $p_{HA}$.

In the case of the electropneumatic service brake device, the following can be provided a) normal operation, in which the electric service brake circuit is subject to open-loop/closed-loop control in particular exclusively by the primary brake control device, and/or
 b) a first redundancy level, in which the at least one pneumatic service brake circuit is controlled by the at least one pneumatic brake control pressure (p1, p2) generated by the electrically actuated actuator, and/or
 c) a second redundancy level, in which the at least one pneumatic service brake circuit is pneumatically controlled in particular exclusively by the at least one pneumatic brake control pressure (p1, p2) generated by actuation of the service brake actuating member.

The invention also relates to a vehicle, in particular a towing vehicle, configured to tow a trailer which comprises electric equipment as described above.

Advantageous developments of the invention can be found in the claims, the description and the drawings. The advantages of features and of combinations of several features mentioned in the introduction to the description are merely exemplary and can have an effect alternatively or cumulatively without the advantages necessarily having to be achieved by embodiments according to the invention. Further features can be found in the drawings—in particular the geometries shown and the relative dimensions of several components to one another and their relative arrangement and effective connection. The combination of features of different embodiments of the invention or of features of different claims is also possible in deviation from the selected dependency references of the claims and is hereby suggested. This also applies to such features which are shown in separate drawings or are mentioned in the description thereof. These features can also be combined with features of different claims. Likewise, features listed in the claims may be omitted for further embodiments of the invention.

An exemplary embodiment of the invention is shown below in the drawing and explained in greater detail in the following description.

DETAILED DESCRIPTION

Figure 1:
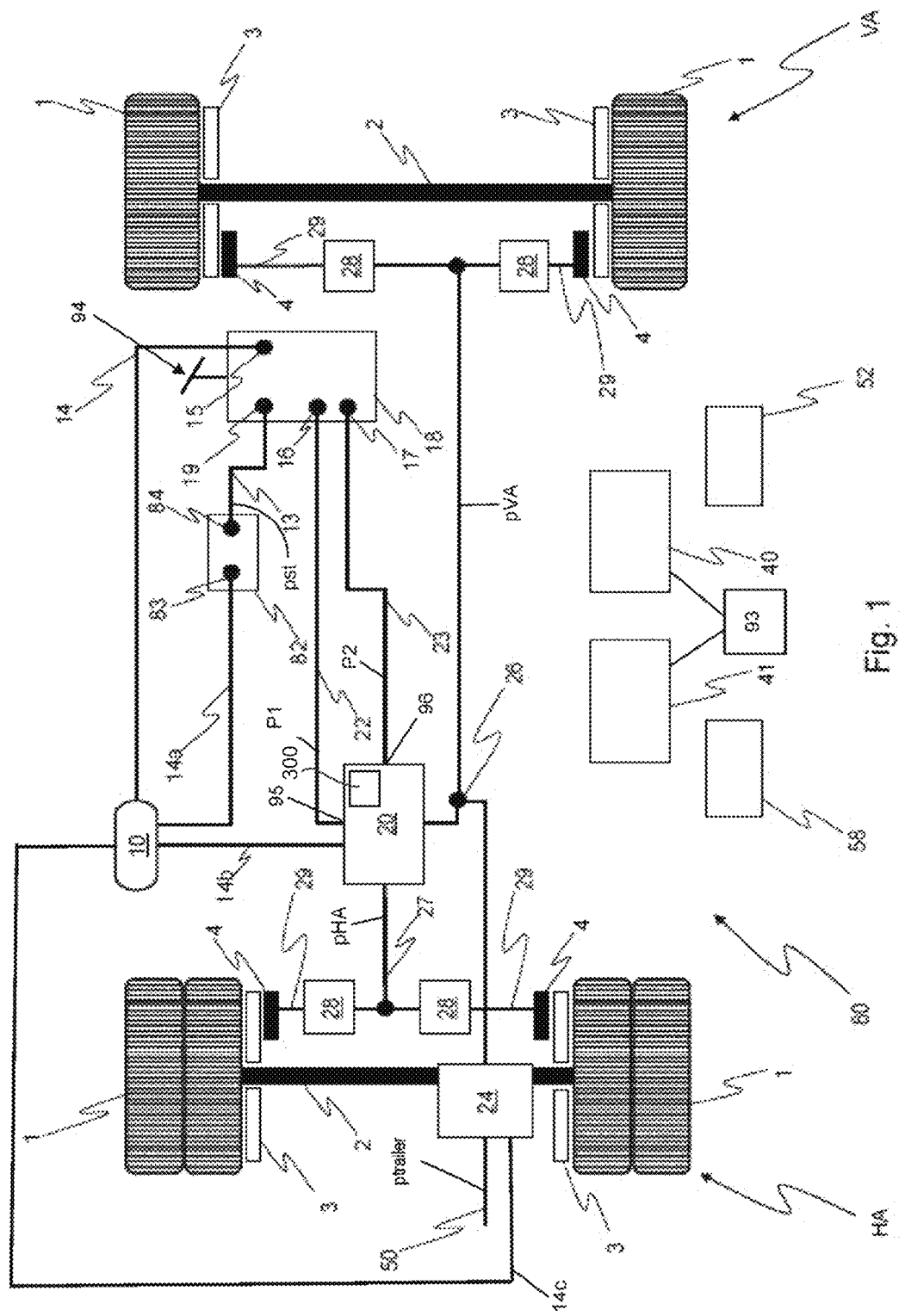
FIG. 1 shows a schematic circuit diagram of an exemplary embodiment of electric equipment according to the invention, wherein pneumatic connections are shown there.
Figure 2:
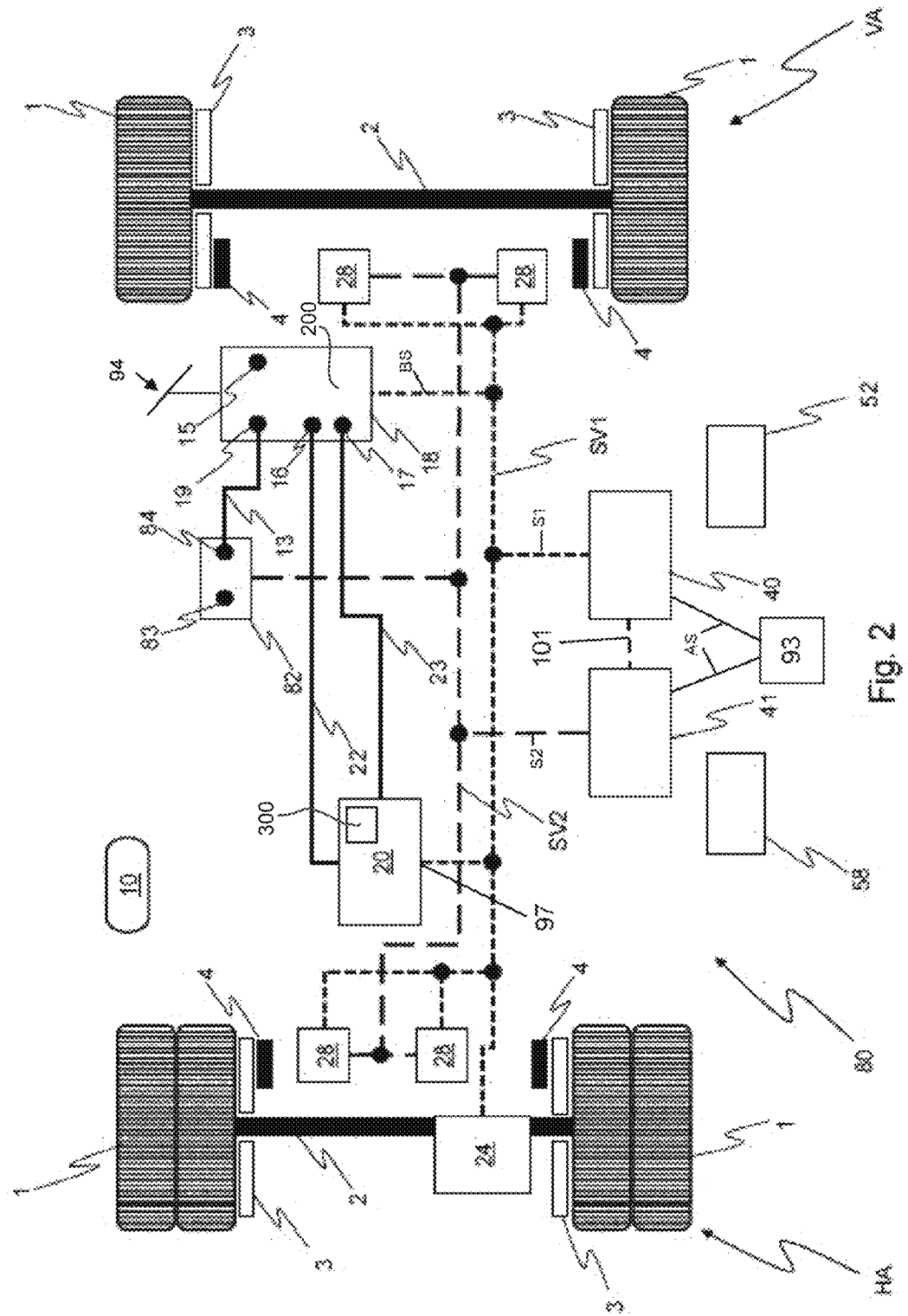
FIG. 2 shows a schematic circuit diagram of the electric equipment of FIG. 1, wherein electric connections and partially pneumatic connections are shown.

FIG. 1 shows a schematic circuit diagram of an exemplary embodiment of electric equipment according to the invention, with an electropneumatic service brake device 80, wherein pneumatic connections are shown there, and FIG. 2 shows a schematic circuit diagram of the electric equipment of FIG. 1, wherein electric connections and partially pneumatic connections are shown there. The following description of the electric equipment refers to both figures.

A front axle VA and a rear axle HA are shown, each of which has wheels 1 that are rotatably mounted on an axle 2. The wheels 1 are each assigned a pneumatic wheel brake actuator 4, which in the example shown are configured as pneumatic service brake cylinders. Such a pneumatic wheel brake actuator 4 is arranged on each wheel 1 and here actuates, for example, a disc brake 3 to generate a braking force.

To perform service braking, a brake pressure $p_{VA}$ or $p_{HA}$ is applied to the pneumatic wheel brake actuator 4, thus creating a frictional force in the disc brake 3 that results in a braking torque. Furthermore, rotational speed sensors (not shown) are provided on the wheels 1 to detect rotational speeds of individual wheels 1 and process them in higher functions, such as ABS, TCS or ESP.

The representation of further components of the vehicle and in particular the axle structure or the structure of the brakes, has been omitted in this representation for reasons of clarity. Furthermore, such a brake and vehicle structure is not to be regarded as limiting the subject matter of the invention. It serves merely as an example to illustrate the mode of operation of the subject matter of the invention. Rather, alternative set-up possibilities of an electropneumatic service brake device are also conceivable, such as drum brakes instead of the disc brakes 3 shown. Further embodiments of a vehicle are also conceivable. For example, more than one front or rear axle VA, HA, i.e. more than two axles in total, could be provided.

The electropneumatic service brake device 80 is described below. This has a compressed air supply 10, which supplies different components 18, 20, 24, 82 of the electropneumatic service brake device 80 with compressed air via supply lines 14, 14a, 14b, 14c.

Figure 3:
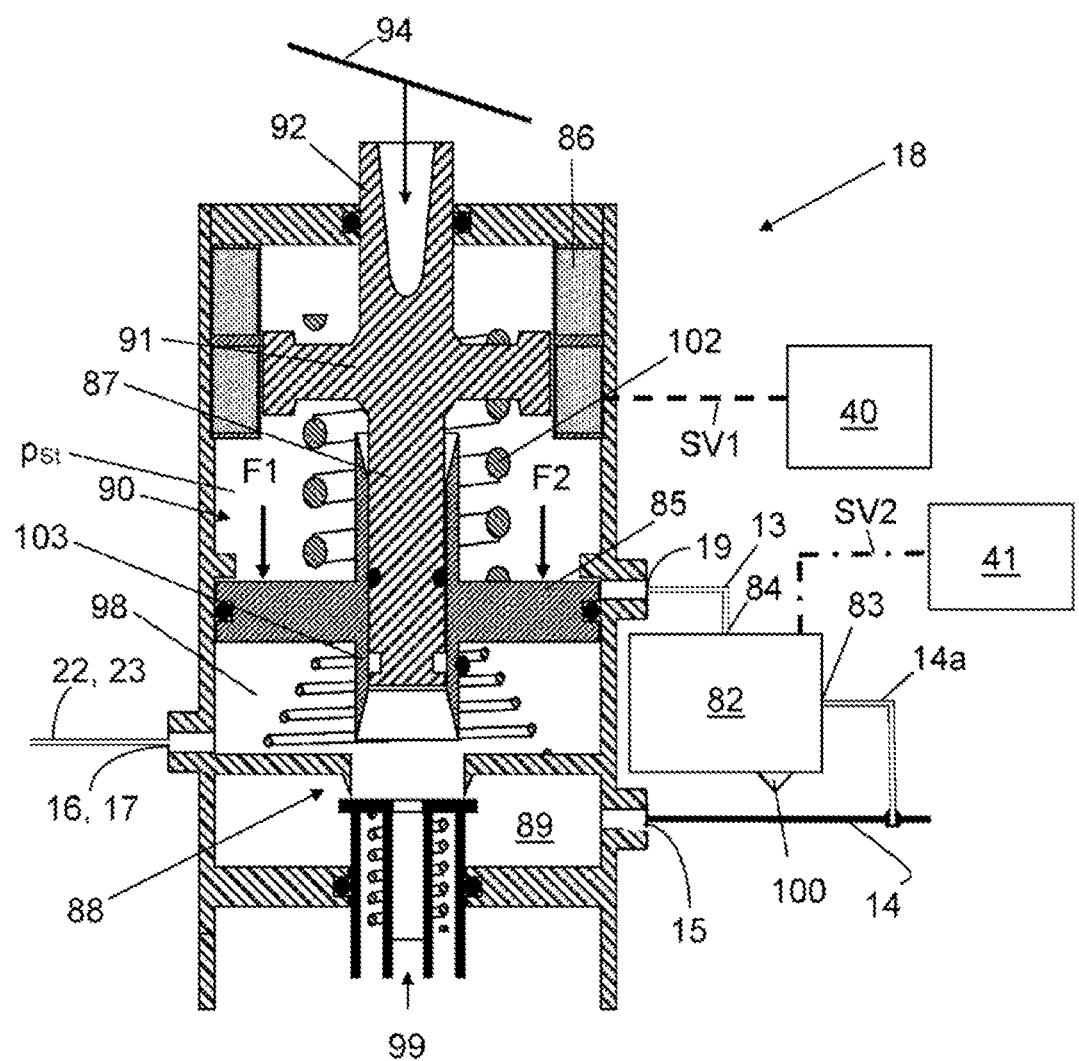
FIG. 3 a schematic cross-sectional view of a service brake valve device of an electropneumatic service brake device of the electric equipment of FIG. 1 and FIG. 2 according to an exemplary embodiment of the invention in a "driving" position.

One component here is an electropneumatic service brake valve device 18 shown schematically in FIG. 3, here for example in the form of a foot brake module, which is connected to the supply line 14 via a supply input 15. The service brake valve device 18 is supplied with compressed air in this way. The service brake valve device 18 also has a pneumatic control input 19, via which it can receive a pneumatic control pressure $p_{St}$, which is then used to pneumatically control the service brake valve device 18. In addition, the service brake valve device 18 has two pneumatic control outputs 16, 17 via which it can output a first pneumatic brake control pressure $p_1$ and/or a second pneumatic brake control pressure $p_2$ into pneumatic control lines 22, 23.

Furthermore, the service brake valve device 18 has a service brake actuating member 94, such as a brake pedal, via which braking requests from a driver can be input. The service brake valve device 18 is configured to detect a braking request from the driver via a brake value transmitter 86, which is in particular electric and operates without contact, shown in FIG. 3, within its electric channel and to input said request as an actuation-dependent electric actuation signal BS into a primary control connection SV1, as shown in FIG. 2. Via the primary control connection SV1, the electric actuation signal BS is then fed into a primary electronic brake control device 40, which is formed here, for example, by the electronic EBS control unit. Depending on the actuation signal BS, the primary electronic brake control device 40 then generates a first electric braking request signal S1, in which higher functions such as axle load-dependent brake force distribution are also taken into account. In this respect, the first electric braking request signal S1 can also differ for the front axle VA and rear axle HA, or is formed in relation to the axle.

The service brake valve device 18 has a housing in which a plunger piston 91 with a plunger receptacle 92 projecting through a cover opening of a housing cover is received so as to be axially movable. A plunger not shown here projects into the plunger receptacle 92 from above and is connected to the service brake actuating member 94 here, for example in the form of a foot brake plate. Therefore, when the driver actuates the service brake actuating member 94, the plunger pushes into the plunger receptacle 92 and the plunger piston 91 is moved downward by the actuating force in FIG. 3, as illustrated there by the arrow. The plunger piston 91 transmits the actuating force to a control piston 85, which is also axially movably mounted in the housing 2, which may be via a plunger piston compression spring 102.

Furthermore, the control piston 85 is in mechanical operative connection with the plunger piston 91 via a plunger piston rod 87, wherein the plunger piston rod 87 is connected to the plunger piston 91 and is able to strike axially in an end of the control piston 85 configured as a cup-shaped sleeve 103 when the plunger piston rod 87 has reached the bottom of the sleeve 103, for example when the plunger piston 91 is moved towards the control piston 85 as a result of an actuation of the service brake actuating member 94 On the other hand, the plunger piston rod 87 may slide in the sleeve 103 when the plunger piston 91 is moved away from the control piston 85.

On the other side of the control piston 85, an outlet seat of a double-seat valve 88 is formed on a piston rod of the control piston 85 and seals against or is lifted from a cup-shaped and hollow valve body of the double-seat valve 88, which is axially movably mounted in the housing, and frees a flow cross-section between a working chamber 98 and a head-side through-opening in the valve body, which leads to a vent port 99. The working chamber 98 is in communication with control outputs 16, 17, and these are in communication with control lines 22, 23, which in turn are connected to the pneumatic control inputs 95, 96 of a pressure control module 20. For the sake of simplicity, the control outputs 16, 17 are placed in one connection here in the drawing, but in reality there are two separate control outputs 16, 17.

In the service brake valve device 18, a control chamber 90 is formed between the plunger piston 91 and the surface of the control piston 85 facing it. The pneumatic control input 19 on the housing opens out here into the control chamber 90.

The control line 13 and thus also the control output 84 of a solenoid valve device 82 is connected to the pneumatic control input 19, and said solenoid valve device is connected at its supply input 83 to the supply line 14a connected to a compressed air supply 10. Furthermore, the housing of the service brake valve device 18 also has the supply input 15, to which the supply line 14 is connected and which is connected to a supply chamber 89 of the service brake valve device 18.

The valve body is urged by means of a valve body compression spring supported at the bottom of the housing and at the interior of the valve body against an inlet seat of the double-seat valve 88, which is formed at a radially inner edge of a central through-bore of a further inner wall of the housing. In the state of the valve body lifted from the inlet seat against the action of the valve body compression spring, a flow cross-section is released between the supply inlet 15 or the supply chamber 89 and the working chamber 98, which allows a flow of compressed air under supply pressure into the control outlets 16, 17, i.e., into the control lines 22, 23, in order to aerate the wheel brake actuators 4 of the relevant axle or of the relevant brake circuit, front axle brake circuit and rear axle brake circuit.

FIG. 3 shows the "driving" position of the service brake valve device 18, in which the outlet seat is lifted off the valve body and the control outputs 16, 17 and thus also the wheel brake actuators 4 connected there are connected to the vent port 99. As a result, the active pneumatic wheel brake actuators 4 are released.

A pressure control module 20 according to FIG. 1 and FIG. 2 is sufficiently known, for example from page 763, in particular Image E of "Kraftfahrtechnisches Taschenbuch", 24th edition, April 2002, Robert Bosch GmbH. The two-channel pressure control module 20 shown there by way of example includes, for each channel (here, for example, front axle channel and rear axle channel), an electromagnetic backup valve 300, which here is controlled by the primary electronic brake control device 40, wherein in each case one backup valve 300 is connected to a pneumatic control input 95, 96. On the output side, the backup valve 300 is connected to a pneumatic control input of an integrated relay valve. In its state energized by the primary electronic brake control device 40, i.e., when the electric service brake circuit is intact, such a backup valve 300 switches to its closed position and thus retains a pneumatic brake control pressure applied to it. In the energized state, the backup valve 300 switches to its open position, allowing the pneumatic brake control pressure to act on the relay valve, which then boosts the volume of the pneumatic brake control pressure on the basis of the supply pressure from the compressed air supply 10 fed into the pressure control module 20 and then outputs it as front axle brake pressure $p_{VA}$ and rear axle brake pressure $p_{HA}$ at pressure outputs of the pressure control module 20 in lines 26, 27, which are connected to the wheel brake actuators 4 via pressure control valves 28. The pressure control valves 28 may be connected to the primary control connection SV1 and to a secondary control connection SV2.

In addition, the pressure control module 20 includes an inlet-outlet solenoid valve combination controlled by an integrated electronic pressure control module control unit, which is connected on the output side to the pneumatic control input of the relay valve. Therefore, the relay valve can be energized either by the pneumatic brake control pressure controlled through the de-energized backup valve 300 or by the pneumatic brake control pressure generated electrically by controlling the inlet-outlet solenoid valve combination by means of the integrated electronic pressure control module control unit. The pressure control module control unit is connected via an electric control input 97 to the primary control connection SV1, to which the primary electronic brake control device 40 is also connected, whereby the pressure control module control unit can be controlled or supplied with control signals by the primary electronic brake control device 40.

In addition, a pressure sensor for measuring the actual brake pressure $p_{Va}$ or $p_{HA}$ output by the relay valve is integrated in such a pressure control module 20. The actual brake pressure measured by the pressure sensor is then compared with a target brake pressure in the sense of a pressure control, which is represented by a first electric braking request signal S1 that is input into the primary control connection SV1 by the primary electronic brake control device 40. For this purpose, the electronic pressure control module control unit of the pressure control module 20 comprises corresponding pressure control routines.

The solenoid valve device 82 enables electronically controlled aeration or venting of the control chamber 90 and is electrically controlled by a secondary electronic brake control device 41. For this purpose, the solenoid valve device 82 is connected to an electric control input at a secondary control connection SV2, which is formed here, for example, by a second CAN data bus.

In particular, the primary electronic brake control device 40, the electric/electronic part of the pressure control module 20 and the brake value transmitter 86 of the service brake valve device 18 are connected to the primary control connection SV1, which is separate and independent from the secondary control connection SV2, to which the secondary electronic brake control device 41 and the solenoid valve device 82 are connected.

In particular, a data link 101 may be provided between the primary electronic brake control device 40 and the secondary electronic brake control device 41, in particular for data and signal exchange and/or for the purpose of mutual monitoring. In particular, the actuation signal BS and/or the first electric braking request signal S1 can also be input into the secondary electronic brake control device 41 and/or the second electric braking request signal S2 can be input into the primary electronic brake control device 40 via the data link 101. Intactness of the primary electronic brake control device 40 and the secondary electronic brake control device 41 are not required for this, because the signals may be merely looped through.

In addition to a venting 100 shown in FIG. 3, the solenoid valve device 82 may have at least one pressure sensor, not shown here, for measuring the actual value of the pneumatic control pressure $p_{ST}$ at the control output 84, so that, in conjunction with corresponding algorithms in the secondary electronic brake control device 41, to which this actual value is reported, pressure control of the output control pressure $p_{ST}$ is possible or is also may be carried out.

The secondary electronic brake control device 41 controls the solenoid valve device 82 via the secondary control connection SV2 by a second electric braking request signal S2, wherein the solenoid valve device 82 then generates the pneumatic control pressure $p_{ST}$ at the control output 84 depending on the second electric braking request signal S2.

For example, within the solenoid valve device 82, an electropneumatic proportional valve can provide a control pressure $p_{St}$ at the control output 84, which pressure is (proportionally) controlled in accordance with the second electric braking request signal S2, wherein an aeration and venting is likewise possible. In a further embodiment, not shown here, an inlet/outlet valve combination can be provided, for example consisting of two 2/2-way solenoid valves, wherein the inlet valve connected to the supply input 83 is closed when de-energized and open when energized, and the outlet valve is open when de-energized and closed when energized. Also, according to a further embodiment, a 3/2-way solenoid valve can be used as a solenoid valve device 82 as an aerating and venting valve with an aerating position and a venting position in combination with a 2/2-way solenoid valve as a holding valve, which holds the pressure at the control outlet in its closed position.

In particular, such a solenoid valve device 82 can be used in any of the embodiments described above in combination with a pressure sensor and a control pressure controller implemented in the secondary electronic brake control device 41 to control the pneumatic control pressure $p_{St}$ applied at the control output 84.

Furthermore, the electric equipment comprises a driver assistance system 93, for example an autopilot device or an emergency brake assistant, which can automatically generate braking requests which are then represented by an assistance braking request signal AS which is, for example, controlled here both in the primary electronic brake control device 40 and in the secondary electronic brake control device 41, as shown in FIG. 2. Alternatively, the assistance braking request signal AS could also be fed only into the secondary electronic brake control device 41. With the autopilot device, at least partially autonomous driving is possible.

Also, the routines of the driver assistance system 93 could be implemented in the primary electronic brake control device 40 and/or in the secondary electronic brake control device 41.

Last but not least, the primary electronic brake control device 40 is supplied with electric energy from a primary supply source 52 which is independent of a secondary supply source 58 which supplies electric energy to the secondary electronic brake control device 41.

In the following, a normal operation, a first redundancy level, a second redundancy level and a start operation of the electropneumatic service brake device will be described.

Normal Operation
Driver Braking

When the driver actuates the service brake actuating member 94 of the service brake valve device 18, corresponding to a driver braking request, the degree of actuation is measured in the intact superordinate electric service brake circuit via the two redundant brake value transmitters 86, which may be arranged axially one behind the other and may operate without contact. The electric actuation signal BS detected by the brake value sensor 86 is generated in the electric channel of the service brake valve device 18, made data bus-compatible and fed into the primary electronic brake control device 40 via the primary control connection PV1. Since higher functions such as axle load-dependent brake force distribution are implemented in the primary electronic brake control device 40, a first braking request signal S1 is generated there separately for each of the front axle VA and the rear axle HA on the basis of the electric actuation signal BS and is fed into the relevant channel of the pressure control module 20 and into the trailer control module 24. There, the brake pressure $p_{VA}$ for the front axle VA and the brake pressure $p_{HA}$ for the rear axle HA are then generated in each case by the integrated solenoid valves and the relay valves based on the respective braking request signal S1 and are fed into the wheel brake actuators 4 via the pressure control valves 28, which are open here for example, in order to implement the requested service braking. In an analogous manner, the trailer control module 24, which is also configured as a pressure control module, converts the first braking request signal S1 into a trailer brake pressure $p_{trailer}$, which is then fed into a possibly coupled trailer via a "trailer" coupling head not shown here.

For example, with the brake pressure $p_{VA}$ for the front axle VA as the pneumatic control pressure, the trailer control module 24 is pneumatically controlled in the downstream pneumatic brake circuit, wherein this pneumatic control pressure is retained by the backup valve 300, which is integrated, energized and thus closed, and is thus not used.

If excessive brake slip occurs during braking requested by the driver, the primary electronic brake control device 40, in which ABS routines may be implemented, controls the pressure control valves 28 (FIG. 2) connected to the primary control connection SV1 and to the secondary control connection SV2 in order to control the brake pressure individually for each wheel until the brake slip becomes permissible. The same applies, of course, to wheel-specific open-loop/closed-loop control of the brake pressures as part of an ESP driving dynamics control system.

In parallel, during the driver braking request in the downstream pneumatic service brake circuit or in the two pneumatic channels of the service brake valve device 18, the plunger piston 91 is displaced downwards, wherein the plunger piston 91 is forced against the bottom of the cup-shaped sleeve 103 and also displacing the control piston 85 downwards until the outlet seat seals against the valve body, thus closing the connection between the control outlets 16, 17 for the pneumatic service brake circuits and the venting port 99, so that no further venting of the associated wheel brake actuators 4 can take place.

When the service brake actuating member 94 is actuated further in response to the driver's braking request, the valve body is then forced downwards with the outlet seat resting against it, lifting off from the inlet seat. As a result, compressed air under supply pressure passes from the supply chamber 89 into the working chamber 98 and from there into the control outlets 16, 17 for the pneumatic service brake circuits and into the associated wheel brake actuators 4, respectively, in order to aerate and thus apply the latter. This is an all-driver brake application, in which, due to the actuating force exerted on the service brake actuating member 94 by the driver in dependence on the driver's braking request, a first actuating force F1 is exerted on the control piston 85 via the plunger piston compression spring 102, which ultimately places the latter in its aerating position.

In such braking initiated purely by a driver braking request, the solenoid valve device 82 is controlled by means of the secondary electronic brake control device 41 into venting position, in which the control chamber 90 is in communication with the atmosphere, to avoid pressure effects that could occur as a result of the expansion of the control chamber 90. The command for this is received by the secondary electronic brake control device 41, for example, via data link 101 from the primary electronic brake control device 41.

However, since the superordinate electric service brake circuit is intact, the first and second brake control pressures p1 and p2 applied to the control outputs 16, 17 and applied to the pneumatic control inputs 95, 96 of the pressure control module 20 via the control lines 22, 23 are retained at the backup valves 300 in the pressure control module 20, said valves then being energized and consequently closed, and are not transmitted to the integrated relay valves.

This means that if the superordinate electric service brake circuit is intact, the secondary pneumatic service brake circuit is ineffective.

Automatic/Autonomous Braking

In the following, we will now consider the case in which the driver does not exercise a braking request and therefore does not actuate the service brake actuating member 94, but the driver assistance system 93 inputs an assistance braking request signal AS to both the primary electronic brake control device 40 and the secondary electronic brake control device 41, respectively, as indicated in FIG. 2.

Here, the primary electronic brake control device 40 may generate a first electric braking request signal S1 on the basis of the assistance braking request signal AS, which is then converted into corresponding brake pressures $p_{VA}$, $p_{HA}$, and $p_{trailer}$ in the electric service brake circuit as described above by the pressure control module 20 and the trailer control module 24. Consequently, the assistance braking request signal AS is then converted by the intact electric service brake circuit or the intact pressure control module 20.

In parallel thereto or simultaneously, the secondary electronic brake control device 41 generates the second electric braking request signal S2 on the basis of the assistance braking request signal AS, which is fed via the secondary control connection SV2 to the solenoid valve device 82, which is then set to the aerating position and thereby generates the pneumatic control pressure $p_{St}$ with which the control chamber 90 is pressurized. The control pressure $p_{St}$ then prevailing in the control chamber 90 acts back on the plunger piston 91, limiting it, and thus on the service brake actuating member 94, which the driver can feel on their foot when they touch the service brake actuating member 94 (pedal response). Thus, the driver can feel an initiation of automatic braking at their foot.

Depending on the modulation of the pneumatic control pressure $p_{St}$ fed into the control chamber 90, it is then possible to set a defined second actuating force F2 on the control piston 85. The second actuating force F2, which may act on the control piston 85 in parallel and in the same direction with respect to the first actuating force F1, ensures, as described above for the first actuating force F1, that the first and second pneumatic brake control pressures p1, p2 are generated, which are fed into the pressure control module 20 at the control outputs 16, 17 and via the control lines 22, 23. There, however, the first and second pneumatic brake control pressures p1, p2 are retained by the backup valves 300, which are energized by the primary electronic brake control device 40 and thus kept closed, and are therefore (initially) ineffective. However, the first and second pneumatic brake control pressures p1, p2 can become effective immediately in the pressure control module 20 at the integrated relay valves if the backup valves 300 are de-energized as a result of a defect in the electric service brake circuit and are thus open.

Combination of Driver Braking and Autonomous/Automatic Braking

Furthermore, a situation is also conceivable in which braking is to be performed in response to both a driver braking request and an automatically generated braking request, for example if the driver brakes due to an emergency braking situation, but the braking request of the driver assistance system, for example in the form of an emergency braking assistant or an autopilot device, is greater than the braking request of the driver.

Then, in the electric service brake circuit controlled by the primary electronic brake control device 40, the brake pressures $p_{VA}$ and $p_{HA}$ are formed predominantly on the basis of the assistance braking request signal AS. In other words, in the superordinate electric service brake circuit, the braking request of the driver is overridden by the braking request of the driver assistance system.

In parallel thereto, the first actuating force F1 from the driver's braking request and the second actuating force F2 from the automatically generated braking request act in the same direction and in parallel on the control piston 85 of the service brake valve device 18, wherein the actuating forces F1, F2 add up at the control piston 85 and then the first pneumatic brake control pressure p1 and the second pneumatic brake control pressure p2 are output at the control outputs 16, 17, and the first pneumatic brake control pressure p1 and the second pneumatic brake control pressure p2 are output via the control lines 22, 23 into the pneumatic control inputs 95, 96 of the pressure control module 20, but are retained there by the backup valves 300 energized by the primary electronic brake control device 40.

First Redundancy Level

If a defect or fault now occurs in the superordinate electric service brake circuit, whether due to the fact that the primary supply source 52, the primary electronic brake control 40 and/or the electrical/electronic part of the pressure control module 20 has a defect or has failed, the two backup valves 300 integrated in the pressure control module 20 are de-energized and thereby switch to their open position, whereby in the event of a braking request by the driver assistance system 93, i.e., after a generation of the second electric braking request signal S2, the first and second brake control pressures p1, p2 then already present there can control the relevant integrated relay valve, whereby the brake pressure $p_{VA}$ for the front axle VA and the brake pressure $p_{HA}$ for the rear axle HA can be generated. Since, for example, the brake pressure $p_{VA}$ for the front axle is used here as a pneumatic control pressure for the trailer control module 24, the trailer brake pressure $p_{trailer}$ can also be generated, so that a possibly coupled trailer can also be braked.

The first redundancy level therefore assumes that the secondary electronic brake control 40 is intact, since otherwise no second electric braking request signal S2 can be generated and the first and second pneumatic brake control pressures p1 and p2 cannot be formed in dependence thereon.

For wheel-specific adaptation of the brake pressures $p_{VA}$ and $p_{HA}$, for example as part of a brake slip control system ABS, a traction slip control system TCS and/or a vehicle dynamics control system ESP, the intact secondary electronic brake control system 41 can individually control the pressure control valves 28 via the secondary control connection SV2 ("hold pressure", "lower pressure", "increase pressure").

In the first redundancy level, if the electric service brake circuit fails, there is therefore electric redundancy due to the first and second pneumatic brake control pressures p1 and p2 in the then effective first and second pneumatic brake circuits, because the first and second pneumatic brake control pressures p1 and p2 are then generated electrically and automatically by means of the secondary electronic brake control 40.

Furthermore, when the electric service brake circuit fails, an automatic braking request is realized by the first and second pneumatic brake control pressures p1 and p2 in the first and second pneumatic brake circuits which are then also effective, wherein the first and second brake control pressures p1 and p2 can then become effective immediately when the electric service brake circuit fails, because they have already been generated in response to the assistance braking request signal AS and are then also already present at the backup valves 300 of the pressure control module 20.

Second Redundancy Level

If, starting from the state of the electropneumatic service brake device 18 in the first redundancy level, i.e., if the primary electronic brake control device 40 has failed, a defect or fault now also occurs in the control of the pneumatic service brake circuit by the secondary electronic brake control device 41 and the solenoid valve device 82, the first and second pneumatic brake control pressures p1 and p2 can no longer be formed electrically, so that autonomous or automatic brake operation by the driver assistance system 93 is then also no longer possible.

Then, the pneumatic service brake circuit can only be controlled by braking requests from the driver and the then mechanically generated first and second pneumatic brake control pressures p1 and p2. Since the backup valves 300 in the pressure control module 20 are then de-energized and consequently switched to their open position, the first and second pneumatic brake control pressures p1 and p2 in the pressure control module 20 cause the brake pressure $p_{VA}$ for the front axle and the brake pressure $p_{HA}$ for the rear axle HA to be generated. Since the brake pressure $p_{VA}$ for the front axle VA may be used as the pneumatic control pressure for the trailer control module 24, the trailer brake pressure $p_{trailer}$ can also be generated so that any trailer coupled to the vehicle can also be braked.

However, pressure control and control of the pressure control valves 28 is then no longer possible due to the failure of all electric service brake circuits, so that the brake pressures $p_{VA}$ and $p_{HA}$ can no longer be controlled individually for each wheel.

Therefore, as described above, the electropneumatic service brake device 80 and, in particular, the secondary electronic brake control device 41 (by appropriate programming), the solenoid valve device 82 and the service brake valve device 18 are configured in such a way that the first and second pneumatic brake control pressures p1 and p2 are generated in response to, for example, any automatically generated assistance braking request signal AS representing an autonomous or automatic braking request, and are then immediately and directly applied to the electromagnetic backup valve 300, (still) closed by energization, of the pressure control module 20.

Regardless of whether driver braking and/or automatic braking is requested, the first pneumatic brake control pressure p1 and the second pneumatic brake control pressure p2 are therefore always already present in the pressure control module 20 and can therefore provide for generation of the brake pressures $p_{VA}$, $p_{HA}$ and $p_{trailer}$ immediately after the failure of the electric service brake circuit.

However, in order to reduce wear on the solenoid valve device 82 and on the service brake valve device 18, which are actually activated as described above whenever an autonomous or automatic braking request is made, and also to reduce the resulting acoustic load, the pneumatic control pressure $p_{St}$ and/or the first and second pneumatic brake control pressures p1 and p2 may be only generated electrically if the absolute value of the automatic or autonomous braking request represented by the assistance braking request signal AS is greater than the absolute value of a limit braking request $a_{grenz}$. This restriction may be implemented, for example, by appropriate programming of the secondary electronic brake control device 41.

Therefore, the limit braking request $a_{grenz}$ may represent a non-zero deceleration, for example $-3$ m/s². Therefore, for example, if an automatic or autonomous braking request (deceleration) of $-4$ m/s² is requested, first and second pneumatic brake control pressures p1 and p2 would be generated electrically, whereas if an automatic or autonomous braking request (deceleration) of only $-2$ m/s² is requested, they would not.

Alternatively, however, the limit braking request $a_{grenz}$ may be zero, wherein the first and second pneumatic brake control pressures p1 and p2 are generated electrically for each requested autonomous or automatic brake application in which the magnitude of the braking request is greater than zero.

Also, the first and second pneumatic brake control pressures p1 and p2 can be generated and input into the pneumatic control inputs 95, 96 of the pressure control module 20 in dependence on at least the following variables:

a) a mass ratio between the towing vehicle and the trailer,
b) the axle loads of the rear axle HA and the front axle VA,
c) the number of pneumatic channels of the service brake valve device.

Start-Up

It has been recognized that if, for example, both the electric service brake circuit and an electric starter of the prime mover of the vehicle are supplied with power from the latter, in this case, for example, from the primary power supply source 52, when the ignition or start signal for the prime mover of the vehicle is generated, by which the prime mover of the vehicle is then put into operation by means of the starter, the voltage in the electric service brake circuit may drop to such an extent that said circuit is insufficiently energized and then does not function. The electric service brake circuit would then not be intact for the duration of the voltage drop.

But then, as described above, the timing problem of evaluating the switchover condition to switch to the pneumatic service brake circuit would again occur, wherein, in the event of a failure, a rapid response is required to generate the wheel brake pressure.

It was further recognized that in the event of a voltage dip caused by generation of the ignition or start signal, the electromagnetic backup valves 300 of the pressure control module 20 are de-energized and open so that the first and second brake control pressures p1, p2 generated by the solenoid valve device 82 by means of the pneumatic control pressure pSt can be passed through the open backup valves 300 to allow the pressure control module 20 to generate the brake pressures pHA and pVA for the rear axle and the front axle.

The solenoid valve device 82 is therefore controlled by the secondary electronic brake control device 41, which is powered by the secondary electric supply source 58, for example in such a way that the two pneumatic brake control pressures p1, p2 are generated and fed into the two pneumatic control inputs of the pressure control module 20 independently of, and in particular already before, the ignition or start signal for the prime mover of the vehicle is generated. Since the starter is not powered here by the secondary supply source 58, the secondary supply source 58 is not involved in supplying power to the starter, so that no voltage dip occurs there when the prime mover is started.

Consequently, the pneumatic brake control pressures p1, p2 are already present at the pneumatic control inputs or at the backup valves 300 of the pressure control module 20 independently of the ignition or start signal for the prime mover, in particular if the ignition or start signal for the prime mover of the vehicle has not yet been generated. In the event of a voltage drop caused by the ignition or start signal and the resulting failure or defect of the electric service brake circuit, the then de-energized electromagnetic backup valves 300 of the pressure control module 20 open automatically and the brake pressures pHA and pVA can then be formed immediately in the pressure control module 20 on the basis of or in dependence on the pneumatic brake control pressures p1, p2.

THE LIST OF REFERENCE SIGNS IS AS FOLLOWS 1 wheel
2 axle
3 disc brake
4 wheel brake actuator
10 compressed air supply
13 control line
14 supply line
14a supply line
14b supply line
14c supply line
15 supply input (foot brake module)
16 control output (foot brake module, interface for VA and trailer)
17 control output (foot brake module, interface for HA)
18 service brake valve device
19 control input foot brake module
20 pressure control module
22 control line (for VA and trailer module 24)
23 control line (for HA)
24 trailer control module
26 line
27 line
28 pressure control valve
29 brake line
40 primary electronic brake control device
41 secondary electronic brake control device
50 brake line (to trailer)
52 primary supply source
58 secondary supply source
80 electropneumatic service brake device
82 solenoid valve device
83 supply input (solenoid valve device)
84 control output (solenoid valve device)
85 control piston
86 brake value transmitter
87 plunger piston rod
88 double seat valve
89 supply chamber
90 control chamber
91 plunger piston
92 plunger receptacle
93 driver assistance system
94 service brake actuating element
95 pneumatic control input
96 pneumatic control input
97 electric control input
98 working chamber
99 vent port
100 venting
101 data connection
102 plunger piston compression spring
103 sleeve
SV1 (electronic) primary control connection
SV2 (electronic) secondary control connection
HA rear axle
VA front axle
BS electric actuation signal
AS assistance braking request signal
F1 first force
F2 second force
S1 first electric braking request signal
S2 second electric braking request signal
p1 first pneumatic brake control pressure
p2 second pneumatic brake control pressure
pSt pneumatic control pressure
pVA brake pressure front axle
pHA brake pressure rear axle
ptrailer trailer brake pressure

The invention claimed is:

1. An electropneumatic equipment of a vehicle with a prime mover operable by an ignition or starting signal, comprising:
    an electropneumatic service brake device, wherein the electropneumatic service brake device includes:
    a) pneumatic wheel brake actuators,
    b) at least one electric service brake circuit,
    c) at least one pneumatic service brake circuit,
    d) an at least electric service brake input device, which generates an electric actuation signal within the at least one electric service brake circuit,
    e) within the electric service brake circuit, a primary electronic brake control device which generates a first electric braking request signal representing a target brake pressure in dependence on the electric actuation signal,
    f) a secondary electronic brake control device which controls at least one electrically actuated actuator by means of a second electric braking request signal, which actuator is configured to generate at least one pneumatic brake control pressure based on the second electric braking request signal,
    g) at least one electropneumatic pressure control module with an integrated electronic control unit as a component of the at least one electric service brake circuit, the pressure control module including at least one pneumatic control input, wherein the at least one electropneumatic pressure control module is configured
    g1) to receive the first electric braking request signal at an electric control input of the pressure control module and to generate an electronically controlled brake pressure for the wheel brake actuators within the at least one electric service brake circuit in dependence on the first electric braking request signal, and
    g2) to receive the at least one pneumatic brake control pressure at the at least one pneumatic control input of the pressure control module and to generate a brake pressure for the wheel brake actuators depending on the at least one pneumatic brake control pressure within the at least one pneumatic service brake circuit, and
    g3) to feed the brake pressure into the pneumatic wheel brake actuators, and
    g4) which comprises at least one electromagnetic backup valve which is connected to the at least one pneumatic control input and which is configured and controlled such that it
    g4a) retains the at least one pneumatic brake control pressure when the at least one electric service brake circuit is intact or sufficiently energized, but
    g4b) otherwise, if the at least one electric service brake circuit has a defect or is insufficiently energized, allows the at least one pneumatic brake control pressure to pass through so that the at least one pressure control module can generate the brake pressure in dependence on the at least one pneumatic brake control pressure, wherein h) the at least one electrically actuated actuator is controlled by the secondary electronic brake control device in dependence on an assistance braking request signal automatically generated by a driver assistance system and/or in dependence on the electric actuation signal so that, irrespective of a defect in the electric service brake circuit, the at least one pneumatic brake control pressure is generated by the electrically actuated actuator in response to the assistance braking request signal and/or in response to the brake actuation signal, and is fed into the at least one pneumatic control input of the at least one pressure control module, and/or in that i) the at least one electrically actuated actuator is controlled by the secondary electronic brake control device so that the at least one pneumatic brake control pressure is generated by the at least one electrically actuated actuator independently of a generation of the ignition or start signal for the prime mover of the vehicle and is fed into the at least one pneumatic control input of the at least one pressure control module.

2. The electropneumatic equipment as claimed in claim 1, wherein the at least one actuator is controlled by the secondary electronic brake control device so that the at least one pneumatic brake control pressure is generated and fed into the at least one pneumatic control input of the pressure control module in response to any assistance braking request signal and/or in response to any brake actuation signal which represents a braking request of which the absolute value is greater than the absolute value of a limit braking request.

3. The electro-pneumatic equipment as claimed in claim 2, wherein the limit braking request is zero or represents a non-zero deceleration.

4. The electropneumatic equipment as claimed in claim 1, wherein the service brake input device is:
a) an all-electric service brake input device, which only generates the electric actuation signal but no pneumatic brake control pressure, or
b) an electropneumatic service brake valve device, which in addition to the electric channel generates the at least one pneumatic brake control pressure in at least one pneumatic channel.

5. The electropneumatic equipment as claimed in claim 4, wherein the electropneumatic service brake valve device is configured such that, by an actuation of a service brake actuating member due to a driver braking request, at least one control piston of the service brake valve device is loaded with a first actuation force and the control piston directly or indirectly controls at least one double-seat valve of the service brake valve device including an inlet seat and an outlet seat in order to generate the at least one pneumatic brake control pressure.

6. The electropneumatic equipment as claimed in claim 5, wherein the at least one electrically actuated actuator comprises the service brake valve device as well as means for generating a second actuating force, which acts in parallel with respect to the first actuating force and in the same or opposite direction on the at least one control piston of the service brake valve device.

7. The electropneumatic equipment as claimed in claim 6, wherein the means for generating the second actuating force include an electrically controlled, in particular electric, electrohydraulic or electropneumatic force generator.

8. The electropneumatic equipment as claimed in claim 7, wherein the electropneumatic force generator comprises a solenoid valve device fed from a compressed air supply with supply compressed air under supply pressure, which generates a pneumatic control pressure based on the supply compressed air at the control piston of the service brake valve device, on which the second actuating force is based.

9. The electropneumatic equipment as claimed in claim 7, wherein the secondary supply source supplies electric power to at least a portion of the force generator.

10. The electropneumatic equipment as claimed in claim 5, wherein the electropneumatic service brake valve device is configured to generate a first pneumatic brake control pressure for a first pneumatic service brake circuit and a second pneumatic brake control pressure for a second pneumatic service brake circuit, with the circuits being kept separate.

11. The electropneumatic equipment as claimed in claim 10, wherein the electropneumatic service brake device comprises a trailer control module which is configured as a pressure control module and which is electrically controlled at its electric control input by the first electric braking request signal, and which is pneumatically controlled at its pneumatic control input by the first brake pressure or the second brake pressure.

12. The electropneumatic equipment as claimed in claim 1, wherein the electropneumatic service brake device comprises at least one first brake circuit for a first axle of the vehicle and at least one second brake circuit for a second axle of the vehicle, wherein it is configured such that a first brake pressure for the first brake circuit and a second brake pressure for the second brake circuit are individually generated, wherein the pressure control module is configured as a 2-channel pressure control module and generates the first brake pressure based on the first pneumatic brake control pressure and the second brake pressure based on the second pneumatic brake control pressure.

13. The electropneumatic equipment as claimed in claim 1, wherein the primary electronic brake control device, the integrated electronic control device of the at least one pressure control module and the brake value transmitter of the service brake input device are connected to a primary control connection which is separate and independent from a secondary control connection, to which the secondary electronic brake control device and the at least one electrically actuated actuator are connected.

14. The electropneumatic equipment as claimed in claim 1, wherein the driver assistance system comprises an autopilot device, an emergency brake assistant or a vehicle dynamics control system.

15. The electropneumatic equipment as claimed in claim 1, wherein the secondary electronic brake control device controls the at least one electrically actuated actuator so that the at least one pneumatic brake control pressure is generated and fed into the at least one pneumatic control input of the pressure control module in dependence on at least the following variables:
a) a mass ratio between the vehicle and the trailer,
b) the axle loads of at least two axles of the vehicle,
c) a number of pneumatic channels of the service brake valve device.

16. The electro-pneumatic equipment as claimed in claim 1, wherein the primary electronic brake control device generates the first electric braking request signal depending on the electric actuation signal and/or depending on the assistance braking request signal.

17. The electropneumatic equipment as claimed in claim 1, wherein pressure control valves which can be electrically controlled by the primary electronic brake control device and/or by the secondary electronic brake control device are provided and can be used to individually control the brake pressure in a pneumatic wheel brake actuator.

18. The electropneumatic equipment as claimed in claim 1, wherein:
    a) normal operation is provided, in which the electric service brake circuit is subject to open-loop/closed-loop control in particular exclusively by the primary brake control device, and/or in that
    b) a first redundancy level is provided, in which the at least one pneumatic service brake circuit is controlled by the at least one pneumatic brake control pressure generated by the electrically actuated actuator, and/or in that
    c) a second redundancy level is provided, in which the at least one pneumatic service brake circuit is pneumatically controlled in particular exclusively by the at least one pneumatic brake control pressure generated by actuation of a service brake actuating member.

19. The electropneumatic equipment as claimed in claim 1, wherein an electric primary supply source is provided within the electric service brake circuit and supplies electric power to the primary electronic brake control device.

20. The electropneumatic equipment as claimed in claim 19, wherein the primary electric supply source is independent of a secondary supply source that supplies electric power to the secondary electronic brake control device.

21. The electropneumatic equipment as claimed in claim 1, wherein the service brake input device comprises a service brake actuating member and, within the at least one electric service brake circuit, at least one electric channel with at least one electric brake value transmitter which is actuatable by the service brake actuating member and generates the electric actuating signal in dependence on an actuation of the service brake actuating member.

22. The electropneumatic equipment as claimed in claim 1, wherein the secondary electronic brake control device controls the at least one electrically actuated actuator by the second electric braking request signal depending on an assistance braking request signal automatically generated by a driver assistance system and/or depending on the electric actuation signal and/or independently of the ignition or start signal.

23. A vehicle having a prime mover operable by an ignition or start signal, comprising:
    an electropneumatic equipment, including an electropneumatic service brake device, wherein the electropneumatic service brake device includes:
    a) pneumatic wheel brake actuators,
    b) at least one electric service brake circuit,
    c) at least one pneumatic service brake circuit,
    d) an at least electric service brake input device, which generates an electric actuation signal within the at least one electric service brake circuit,
    e) within the electric service brake circuit, a primary electronic brake control device which generates a first electric braking request signal representing a target brake pressure in dependence on the electric actuation signal,
    f) a secondary electronic brake control device which controls at least one electrically actuated actuator by means of a second electric braking request signal, which actuator is configured to generate at least one pneumatic brake control pressure based on the second electric braking request signal,
    g) at least one electropneumatic pressure control module with an integrated electronic control unit as a component of the at least one electric service brake circuit, the pressure control module including at least one pneumatic control input, wherein the at least one electropneumatic pressure control module is configured
        g1) to receive the first electric braking request signal at an electric control input of the pressure control module and to generate an electronically controlled brake pressure for the wheel brake actuators within the at least one electric service brake circuit in dependence on the first electric braking request signal, and
        g2) to receive the at least one pneumatic brake control pressure at the at least one pneumatic control input of the pressure control module and to generate a brake pressure for the wheel brake actuators depending on the at least one pneumatic brake control pressure within the at least one pneumatic service brake circuit, and
        g3) to feed the brake pressure into the pneumatic wheel brake actuators, and
        g4) which comprises at least one electromagnetic backup valve which is connected to the at least one pneumatic control input and which is configured and controlled such that it
            g4a) retains the at least one pneumatic brake control pressure when the at least one electric service brake circuit is intact or sufficiently energized, but
            g4b) otherwise, if the at least one electric service brake circuit has a defect or is insufficiently energized, allows the at least one pneumatic brake control pressure to pass through so that the at least one pressure control module can generate the brake pressure in dependence on the at least one pneumatic brake control pressure, wherein
    h) the at least one electrically actuated actuator is controlled by the secondary electronic brake control device in dependence on an assistance braking request signal automatically generated by a driver assistance system and/or in dependence on the electric actuation signal so that, irrespective of a defect in the electric service brake circuit, the at least one pneumatic brake control pressure is generated by the electrically actuated actuator in response to the assistance braking request signal and/or in response to the brake actuation signal, and is fed into the at least one pneumatic control input of the at least one pressure control module, and/or in that
    i) the at least one electrically actuated actuator is controlled by the secondary electronic brake control device so that the at least one pneumatic brake control pressure is generated by the at least one electrically actuated actuator independently of a generation of the ignition or start signal for the prime mover of the vehicle and is fed into the at least one pneumatic control input of the at least one pressure control module.

24. The vehicle as claimed in claim 23, wherein the vehicle includes a towing vehicle for towing a braked trailer.

* * * * *